United States Patent
Jiang et al.

(10) Patent No.: US 11,611,404 B2
(45) Date of Patent: Mar. 21, 2023

(54) FOUR-DIMENSIONAL OVER THE AIR PERFORMANCE TEST METHOD FOR DYNAMIC SCENE CHANNEL

(71) Applicant: SOUTHEAST UNIVERSITY, Nanjing (CN)

(72) Inventors: Zhengbo Jiang, Nanjing (CN);
Zhanyuan Wang, Nanjing (CN);
Chong Guo, Nanjing (CN); Wei Hong, Nanjing (CN); Zhangcheng Hao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/862,051

(22) Filed: Jul. 11, 2022

(65) Prior Publication Data

US 2022/0368439 A1  Nov. 17, 2022

(30) Foreign Application Priority Data

Jul. 12, 2021 (CN) .......................... 202110783750.0

(51) Int. Cl.
 *H04B 17/00* (2015.01)
 *H04B 17/391* (2015.01)

(52) U.S. Cl.
 CPC ..... *H04B 17/3912* (2015.01); *H04B 17/0087* (2013.01)

(58) Field of Classification Search
 CPC ............ H04B 17/3912; H04B 17/0087; H04B 17/0082; H04B 17/12; H04B 17/18; H04B 17/30; H04B 17/391; H04B 17/3913
 See application file for complete search history.

(56) References Cited

U.S. PATENT DOCUMENTS

| 8,793,093 B2 * | 7/2014 | Mow ................. H04B 17/0087 455/67.14 |
| 9,024,828 B2 * | 5/2015 | Reed ...................... G01R 29/10 343/703 |
| 9,705,190 B2 * | 7/2017 | Kyösti ................. H04B 7/0617 |

FOREIGN PATENT DOCUMENTS

| CN | 107425895 A | 12/2017 |
| CN | 109639602 A | 4/2019 |

(Continued)

OTHER PUBLICATIONS

He, Yuexia, Research on preamble signal design and preamble capacity enhancement scheme for New Radio in 5G system, Mar. 15, 2018, 85 pages.

(Continued)

*Primary Examiner* — Tuan Pham
(74) *Attorney, Agent, or Firm* — Muncy, Geissler, Olds & Lowe, P.C.

(57) ABSTRACT

The present disclosure discloses a four-dimensional over the air performance test method for a dynamic scene channel. By constructing a time-domain non-stationary dynamic scene channel model, and selecting over the air (OTA) probes of appropriate number, positions and power weight in a four-dimensional multi-probe anechoic chamber (4D-MPAC) test system through a probe selection algorithm, finally a 4D-MPAC dynamic channel test system for a target channel in a DUT test area is constructed, which makes a contribution to solve the current problem of OTA performance test for a time-domain non-stationary channel. The present disclosure aims to provide a four-dimensional multi-probe anechoic chamber (4D-MPAC) for the dynamic scene channel, which can effectively and accurately reproduce a target dynamic scene channel model in an anechoic chamber on the basis of reducing the cost of the test system as much as possible by constructing the dynamic scene channel (Continued)

model, and provide an index for judging the accuracy of constructing the dynamic scene channel model.

3 Claims, 15 Drawing Sheets

(56) References Cited

FOREIGN PATENT DOCUMENTS

CN 112235823 A 1/2021
WO WO2016172875 A1 11/2016

OTHER PUBLICATIONS

Yin, Hang et al., Over-the-air Behavioral Modeling of Millimeter Wave Beamforming Transmitters with Concurrent Dynamic Configurations Utilizing Heterogenous Neural Network, Oct. 14, 2020, pp. 397-400, IEEE/MIT-S International Microwave Symposium.
Pannala, Samu G., Feasibility and Challenges of Over-The-Air Testing for 5G Millimeter Wave Devices, Nov. 1, 2018, pp. 304-310, 2018 IEEE 5G World Forum (5GWF).
Kyosti, Pekka et al., Channel Modelling for Multiprobe Over-the-AirMIMO Testing, May 20, 2012, 12 pages, International Journal of Antennas and Propagation.
Kyosti, Pekka et al., On Radiated Performance Evaluation of Massive MIMO Devices in Multiprobe Anechoic Chamber OTA Setups, Jul. 27, 2018, pp. 5485-5497, IEEE Transactions on Antennas and Propagation.

\* cited by examiner

FOUR-DIMENSIONAL OVER THE AIR PERFORMANCE TEST METHOD FOR DYNAMIC SCENE CHANNEL

TECHNICAL FIELD

The present disclosure belongs to the technical field of wireless communication testing, and particularly relates to a four-dimensional over the air performance test method for a dynamic scene channel.

BACKGROUND

With the advent of the 5th Generation (5G) mobile communication era, the testing principles of the new generation of mobile communications have become the focus of attention in the academic and industrial circles in recent years, while Over-The-Air (OTA) testing gradually replaces conduction testing, and has become the main testing form for 5G millimeter waves and 6G systems. The Multi-Probe Anechoic Chamber (MPAC) is currently the most recognized OTA performance test method in the world due to its high precision and wide application range. According to MPAC, multiple antenna probes are arranged at different positions in the anechoic chamber according to a certain spatial density, which can be spherical, planar, cylindrical or in other distributions, multiple angles of incidence or angles of arrival are simulated, and the spatial channel environment around the device under test (DUT) is constructed by the fading channel matrix generated by a channel simulator. Therefore, the positions, number and power weight of the probes in the MPAC test system have a significant impact on the accuracy of channel simulation. At the same time, since each dual-polarized antenna probe corresponds to two radio frequency channels of the channel simulator, and the channel simulator is very expensive, a suitable probe selection optimization algorithm can greatly reduce the number of channel simulator ports that need to be used, thereby reducing the cost of the MPAC test system.

However, the current MPAC technology is mainly suitable for OTA performance testing where the spatial parameters have time-domain stationarity, and the probe optimization algorithm aims at a certain time point. If the terminal is moving at a high speed, the relative distance and angle between it and the base station are changing rapidly, and the channel exhibits time-domain non-stationary characteristics, then the probe configuration optimized at a certain time moment may not necessarily be used at other time moments. In the vision for 6G, more high-speed motion scenes will be introduced. In addition to high-speed rails, satellites, unmanned aerial vehicles, vehicles, ships and other diverse terminals will also be incorporated into the air-land-sea-space integration scene, such as an unmanned aerial vehicle communication channel which has three-dimensional deployment, high mobility, space-time non-stationarity, etc., which may bring a greater Doppler frequency shift, make the spatial characteristic change of the channel more significantly, and also bring new challenges to OTA performance testing. Up to now, the time-varying scene of spatial parameters is not considered in most of the studies, and it is difficult to simulate the dynamic changes of the spatial parameters such as the angle of arrival and the angle of departure of the device during the moving process, and for the device with a certain motion trajectory and speed under the specific environment, its communication performance cannot be accurately tested.

The existing evaluation criteria for channel simulation accuracy have static properties, while the dynamic scene channel simulation is carried out in a time period rather than at a time point, so a new systematic method and overall evaluation criteria for multi-time point testing are needed so as to more scientifically reflect the effect of channel construction.

SUMMARY

The present disclosure aims to provide a four-dimensional over the air performance test method for a dynamic scene channel so as to solve the technical problem of being able to effectively and accurately reproduce a target dynamic scene channel model in an anechoic chamber on the basis of reducing the cost of a test system as much as possible, and provide an index for judging the accuracy of constructing the dynamic scene channel model.

To resolve the foregoing technical problem, specific technical solutions of the present disclosure are as follows:

A four-dimensional over the air performance test method for a dynamic scene channel includes the following steps:

step 1: performing dynamic scene channel modeling;

step 1.1: determining the motion speed and trajectory of a device under test in a specific scene and a time T to be tested, and determining the position, transmitting power and frequency of a base station and the position, motion speed and direction of user equipment;

step 1.2: discretizing the time period T to be tested into N time moments $[t_1, t_2, \ldots, t_n, \ldots, t_N]$, each time moment respectively corresponding to one of positions $[p_1, p_2, \ldots, p_n, \ldots, p_N]$ of the user equipment, and respectively performing channel modeling algorithm simulation on the user equipment at each time moment to obtain a spatial channel model at each time moment, including an azimuth angle of arrival (AOA), a zenith angle of arrival (ZOA), an azimuth angle of departure (AOD), a zenith angle of departure (ZOD), power and delay of each cluster; stipulating azimuth angle spread of arrival (ASA), zenith angle spread of arrival (ZSA), azimuth angle spread of departure (ASD), zenith angle spread of departure (ZSD), and power angular spectrum (PAS) of each cluster, so as to complete modeling of a dynamic scene cluster delay line channel; and step 1.3: correcting the obtained channel model according to the relative line-of-sight direction between the device under test and the base station at each time moment, simulating the relative position between a terminal and the base station through a three-dimensional turntable, and cooperating with the multipath component simulated by an over the air probe to achieve a dynamic effect; and step 2: constructing a dynamic scene channel model in a multi-probe anechoic chamber test system;

step 2.1: by the constructed power angular spectrum of a target channel and an antenna array of the device under test, determining a target Butler beam forming power pattern $B_t$ in a multi-probe anechoic chamber sector, at the time moment of $t_n$, $B_t(\Omega,t_n)=a^H(\Omega)R_t(t_n)a(\Omega)$, where $\Omega=(\theta, \phi)$ is a solid angle, $\Theta$ is a vertical azimuth angle, $\varphi$ is a horizontal azimuth angle, $a(\Omega) \in C^{U \times 1}$ represents an array steering vector of the device under test when a spatial angle is $\Omega$ in a far-field condition, the $u_t h$ element thereof is $a_u(\Omega)=e^{jk r_u}$, and $k=2\pi/\lambda[\cos\Theta\cos\phi,\cos\Theta\sin\phi, \sin\Theta]$ is a wave vector when the angle is $\Omega=(\Theta, \phi)$, where $\lambda$ is a wavelength; $r_u=[x_u, y_u, z_u]$ is a position vector of the $u_{th}$ antenna, where $x_u, y_u, z_u$ are respectively corresponding rectangular coordinates of the $u_{th}$ antenna in x, y and z directions; $R_t(t_n)$ is a spatial correlation matrix of the target channel of the device under test of an antenna, $R_r(t_n) \triangleq \oint a(\Omega)P_r(\Omega,t_n)a^H(\Omega)$, where $P_r(\Omega, t_n)$ is a corresponding normalized power angular spectrum power when the spatial angle at the time moment of $t_n$ is $\Omega$;

step 2.2: according to the power angular spectrum distribution of the cluster at each time moment obtained by channel modeling, through a probe selection algorithm, selecting K activated antenna probes from a total of M antenna probes, and the selected K probes being used for simulating the dynamic scene channel model within the time period T to be tested;

step 2.3: calculating a simulated Butler beam forming power pattern Be through the selected K activated probes, at the time moment of $t_n$, $B_e(\Omega, t_n) = a^H(\Omega)R_e(t_n)a(\Omega)$, where $R_e(t_n) \in C^{U \times U}$ is a spatial correlation matrix, for simulating the dynamic channel, of the device under test having U antennae in total at the time moment of $t_n$, $R_e(t_n) = \Sigma^k_{k=1} a_e(\Omega_k)P_e(\Omega_k,t_n)a^H_e(\Omega_k)$, where $\Omega_k$ is a solid angle corresponding to the kth probe, $a_e(\Omega_k) \in C^{U \times 1}$ represents an array steering vector of a DUT under the setting of a multi-probe anechoic chamber when the spatial angle is $\Omega_k$ in a far-field condition, and the $u_{th}$ element is $$a_e(\Omega_k) = pl(d_{k,u})e^{j\frac{2\pi}{\lambda}d_{k,u}},$$

where $d_{k,u}$ represents the distance from the kth OTA probe to the $u_{th}$ antenna, and $pl(d_{k,u})$ represents the path loss in this distance; $P_e(\Omega_k,t_n)$ represents the normalized power of the over the air antenna probe with the spatial angle of $\Omega_k$ at the time moment of $t_n$;

step 2.4: proposing a time-averaged four-dimensional power spectrum similarity percentage for the construction quality of the multi-probe anechoic chamber dynamic channel test system in the continuous time T, namely, adding a time dimension on the basis of a static three-dimensional PSP, and the calculation method being as follows:

$$4D\text{-}PSP = \frac{1}{T}\int_T PSP(t)dt;$$

$$PSP(t) = \frac{1}{2}\int\left|\frac{P_r(\beta,t)}{\int P_r(\beta',t)d\beta'} - \frac{P_o(\beta,t)}{\int P_o(\beta',t)d\beta'}\right|d\beta \times 100\%$$

where T is the total sampling duration; 4D-PSP is the four-dimensional power spectrum similarity percentage; $P_o(\beta,t)$ is the target power angular spectrum calculated by using the Butler beam forming algorithm when the angle is $\beta$ at the time of t; $P_r(\beta,t)$ is the power angular spectrum of the constructed channel calculated by using the Butler beam forming algorithm; the angle is $\beta$; the time is a t time; and the four-dimensional power spectrum similarity percentage ranges from 0 to 1; and step 2.5: judging the construction quality of the dynamic channel according to the calculation result of the four-dimensional power spectrum similarity percentage.

Further, in step 1.2, the azimuth angle of arrival and the azimuth angle of departure of each cluster are in the range of −180° to 180°, and the zenith angle of arrival and the zenith angle of departure of each cluster are in the range of 0° to 180°.

Further, in step 2.4, a scheme for calculating the four-dimensional power spectrum similarity percentage when discrete points are taken is:

$$4D\text{-}PSP_t = \frac{1}{N}\sum_{n=1}^{N} PSP(t_n);$$

where N is the number of sampling times at the total time moment of discretizing.

The four-dimensional over the air performance test method for the dynamic scene channel of the present disclosure has the following advantages.

1. A stochastic channel model based on a geometric basis in the four-dimensional power spectrum similarity percentage dynamic scene channel test system is constructed by a channel modeling algorithm, and the method thereof is simple and flexible, and has good applicability to various scenes.

2. The basic construction and test process for constructing the four-dimensional power spectrum similarity percentage test system for the dynamic scene channel is designed. On the basis of ensuring the simulation accuracy of the channel model, the probe selection algorithm can greatly reduce the number of the required channel simulator ports, thereby significantly reducing the cost of the test system.

3. A concept of a four-dimensional power spectrum similarity percentage 4D-PSP is proposed, and by the index, the construction quality of the dynamic scene channel in the multi-probe anechoic chamber test system can be effectively evaluated.

DETAILED DESCRIPTION

To better know the objectives, structures, and functions of the present disclosure, a four-dimensional over the air performance test method for a dynamic scene channel of the present disclosure is further described in detail with reference to the accompanying drawings.

Figure 1:
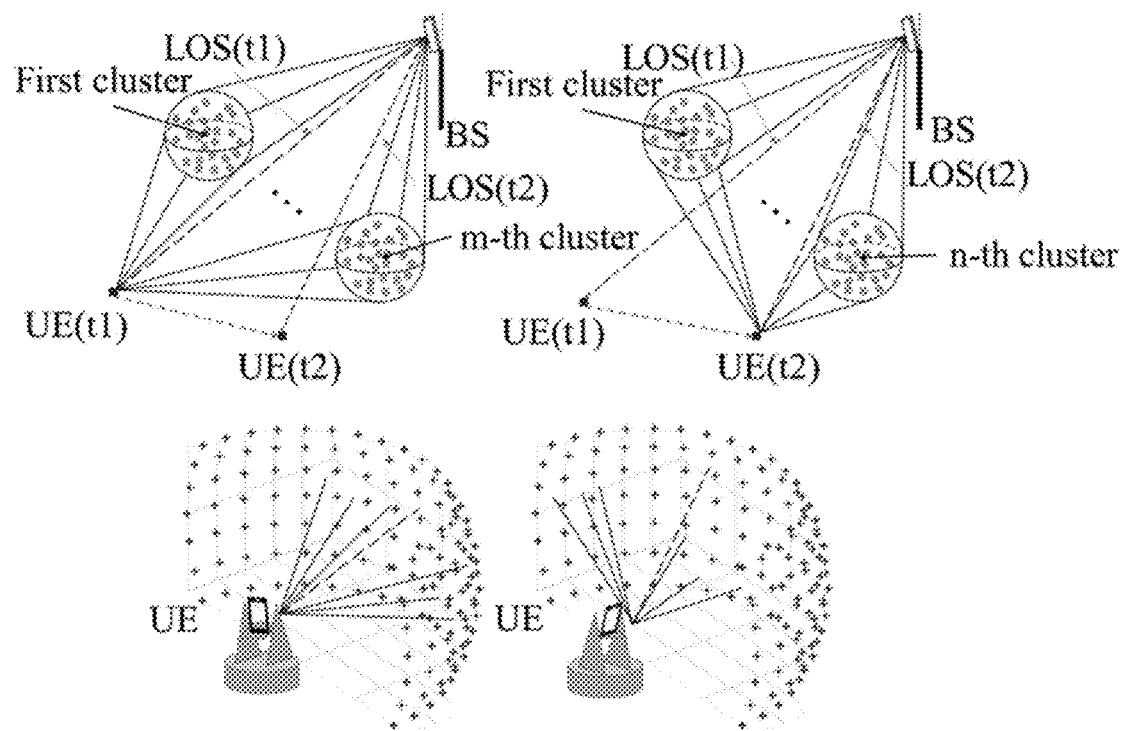
FIG. 1 is a principle block diagram of a four-dimensional multi-probe anechoic chamber test system for a dynamic scene channel according to the design of the present disclosure.

In order to construct a mobile scene channel test system, the continuous time period to be tested needs to be discretized into multiple time moments, and channel modeling is performed at each time moment. In this operation, we need pay attention to the displacement distance between all sampling points to ensure spatial consistency. The channel modeling method can use the ray-tracing (RT) algorithm or other geometry-based stochastic channel model (GBSM) modeling algorithms to obtain the geometric channel model based on a clustered delay line (CDL) at each time moment. The line-of-sight (LOS) direction between DUT and a launch station is used as the reference direction, and by means of the rotation of the DUT on a three-dimensional turntable in the anechoic chamber and the position change of activated probes on an MPAC probe wall, the motion of the device under test is simulated, and the resulting changes in channel parameters such as angle, power, delay, and Doppler frequency are emulated. The principle block diagram of the specific test system is shown in FIG. 1.

The following steps need to be completed in dynamic scene channel modeling:

Step 1: the motion speed and trajectory of a device under test in a specific scene and a time T to be tested are determined, and the position, transmitting power and frequency of a base station and the position, motion speed and direction of user equipment are determined.

Step 2: the time period T to be tested is discretized into N time moments $[t_1, t_2, \ldots, t_n, \ldots, t_N]$, each time moment respectively corresponds to one of positions $[p_1, p_2, \ldots, p_n, \ldots, p_N]$ of the user equipment, and respectively performs channel modeling algorithm simulation on the user equipment at each time moment to obtain a spatial channel model at each time moment, including an azimuth angle of arrival (AOA), a zenith angle of arrival (ZOA), an azimuth angle of departure (AOD), a zenith angle of departure (ZOD), power and delay of each cluster. Azimuth angle spread of arrival (ASA), zenith angle spread of arrival (ZSA), azimuth angle spread of departure (ASD), zenith angle spread of departure (ZSD), and power angular spectrum (PAS) of each cluster are stipulated, so as to complete modeling of a dynamic scene cluster delay line channel. The azimuth angle of arrival and the azimuth angle of departure of each cluster are in the range of −180° to 180°, and the zenith angle of arrival and the zenith angle of departure of each cluster are in the range of 0° to 180°.

Step 3: the obtained channel model according to the relative line-of-sight direction between the device under test and the base station at each time moment is corrected, the relative position between a terminal and the base station through a three-dimensional turntable is simulated, and the multipath component simulated by an over the air probe to achieve a dynamic effect is cooperated with.

A dynamic scene channel model in a multi-probe anechoic chamber test system is constructed by the followings:

Step 1: by the constructed power angular spectrum of a target channel and an antenna array of the device under test, a target Butler beam forming power pattern $B_t$ in a multi-probe anechoic chamber sector is determined, at the time moment of $t_n$, $B_t(\Omega,t_n)=a^H(\Omega)R_t(t_n)a(\Omega)$, where $\Omega=(\Theta, \phi)$ is a solid angle, $\Theta$ is a vertical azimuth angle, $\varphi$ is a horizontal azimuth angle, $a(\Omega) \in C^{U \times 1}$ represents an array steering vector of the device under test when a spatial angle is $\Omega$ in a far-field condition, the $u_{th}$ element thereof is $a(\Omega) \in C^{U \times 1}$, $a(\Omega) \in C^{U \times 1}$ is a wave vector when the angle is $a(\Omega) \in C^{U \times 1}$, where $a(\Omega) \in C^{U \times 1}$ is a wavelength $a(\Omega) \in C^{U \times 1}$ is a position vector of the $u_{th}$ antenna, where $a(\Omega) \in C^{U \times 1}$, $a(\Omega) \in C^{U \times 1}$ are respectively corresponding rectangular coordinates of the $u_{th}$ antenna in x, y and z directions $a(\Omega) \in C^{U \times 1}$ is a spatial correlation matrix of the target channel of the device under test of an antenna, $a(\Omega) \in C^{U \times 1}$, where $a(\Omega) \in C^{U \times 1}$ is a corresponding normalized power angular spectrum power when the spatial angle at the time moment of $t_n$ is $a(\Omega) \in C^{U \times 1}$.

Step 2: according to the power angular spectrum distribution of the cluster at each time moment obtained by channel modeling, through a probe selection algorithm, K activated antenna probes are selected from a total of M antenna probes, and the selected K probes are used for simulating the dynamic scene channel model within the time period T to be tested.

Step 3: a simulated Butler beam forming power pattern Be through the selected K activated probes is calculated, at the time moment of $t_n$, $B_e(\Omega,t_n)=a^H(\Omega)R_e(t_n)a(\Omega)$, where $B_e(\Omega, t_n)=a^H(\Omega)R_e(t_n)a(\Omega)$ is a spatial correlation matrix, for simulating the dynamic channel, of the device under test having U antennae in total at the time moment of $t_n$, $R_e(t_n) \in C^{U \times U}$, where $R_e(t_n) \in C^{U \times U}$ is a solid angle corresponding to the kth probe, $R_e(t_n) \in C^{U \times U}$ represents an array steering vector of a DUT under the setting of a multi-probe anechoic chamber when the spatial angle is $R_e(t_n) \in C^{U \times U}$ in a far-field condition, and the $u_{th}$ element is, where $R_e(t_n) \in C^{U \times U}$ represents the distance from the kth OTA probe to the $u_{th}$ antenna, and $R_e(t_n) \in C^{U \times U}$ represents the path loss in this distance. $R_e(t_n) \in C^{U \times U}$ represents the normalized power of the over the air antenna probe with the spatial angle of $R_e(t_n) \in C^{U \times U}$ at the time moment of $t_n$.

Step 4: a concept of a time-averaged four-dimensional power spectrum similarity percentage (4D PAS Similarity Percentage, 4D-PSP) for the construction quality of the multi-probe anechoic chamber dynamic channel test system in the continuous time T is proposed, namely, a time dimension on the basis of a static three-dimensional PSP is added, and the calculation method is as follows:

$$4D\text{-}PSP = \frac{1}{T}\int_T PSP(t)dt;$$

$$PSP(t) = \frac{1}{2}\int \left| \frac{P_r(\beta, t)}{\int P_r(\beta', t)d\beta'} - \frac{P_o(\beta, t)}{\int P_o(\beta', t)d\beta'} \right| d\beta \times 100\%$$

where T is the total sampling duration. 4D-PSP is the four-dimensional power spectrum similarity percentage.

$P_o(β,t)$ is the target power angular spectrum calculated by using the Butler beam forming algorithm; the angle is β; the time is a t time. $P_r(β,t)$ is the power angular spectrum of the constructed channel calculated by using the Butler beam forming algorithm when the angle is β at the time of t. The four-dimensional power spectrum similarity percentage ranges from 0 to 1.

Since discrete points need to be taken during actual testing, the actual scheme for calculating 4D-PSP is as follows:

$$4D\text{-}PSP_t = \frac{1}{N}\sum_{n=1}^{N} PSP(t_n);$$

where N is the number of sampling times at the total time moment of discretizing.

Step 5: the construction quality of the dynamic channel according to the calculation result of the four-dimensional power spectrum similarity percentage is judged.

The present disclosure relates to a 4D-MPAC dynamic channel test system by constructing a time-domain non-stationary dynamic scene channel model, selecting over the air (OTA) probes of appropriate numbers, positions and power weight in the 4D-MPAC test system through the probe selection algorithm, and finally constructing the target channel in a DUT test area, which makes a contribution to solve the current problem of OTA performance test for a time-domain non-stationary channel. In order to illustrate the principle and flow of the present disclosure in detail, a specific example is given below.

Figure 2A:
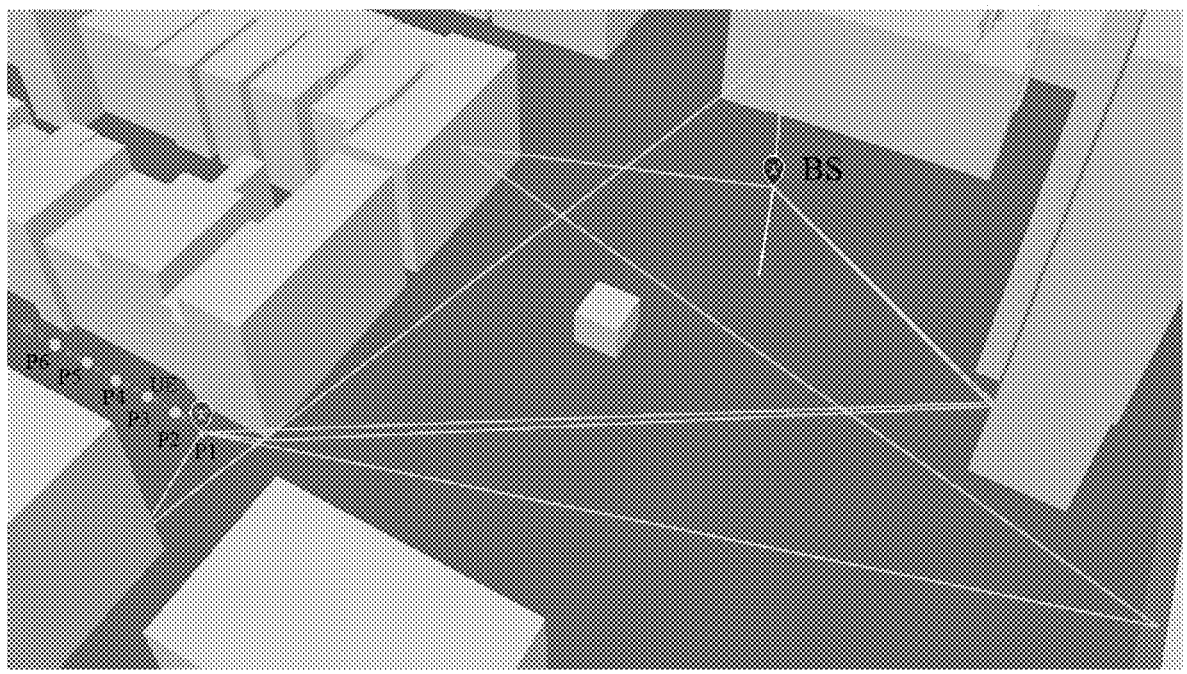
FIG. 2(a) is a structural schematic diagram in which position ray-tracing results at six time moments are constructed in a scene according to an embodiment of the present disclosure.
Figure 2B:
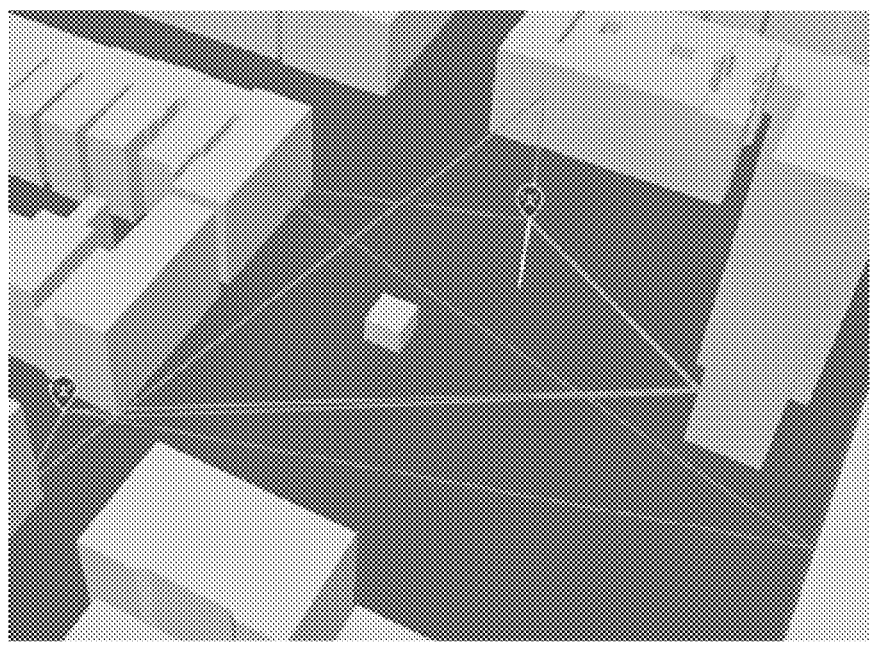
FIG. 2(b) is a structural schematic diagram in which a ray-tracing result at the first time moment is constructed in a scene according to an embodiment of the present disclosure.
Figure 3A:
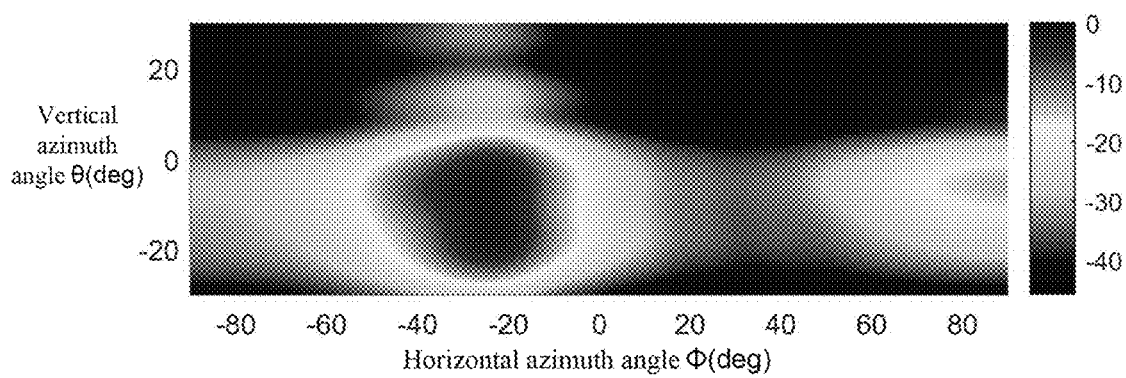
FIG. 3(a) is a target Butler beam forming power pattern at a time moment of t1 according to an embodiment of the present disclosure.
Figure 3B:
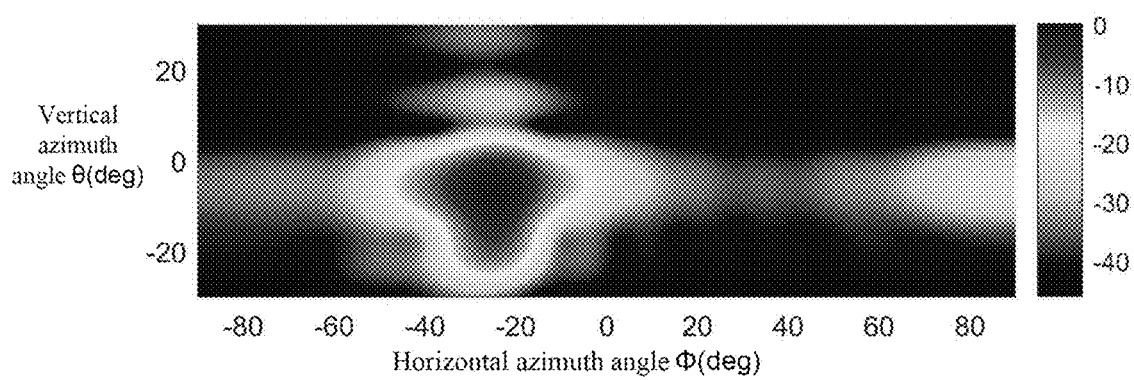
FIG. 3(b) is a simulated Butler beam forming power pattern at a time moment of t1 according to an embodiment of the present disclosure.
Figure 4A:
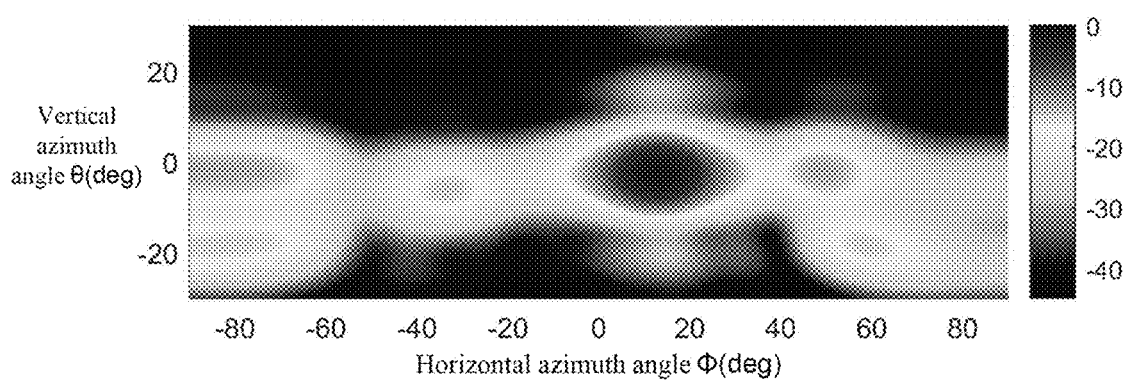
FIG. 4(a) is a target Butler beam forming power pattern at a time moment of t2 according to an embodiment of the present disclosure.
Figure 4B:
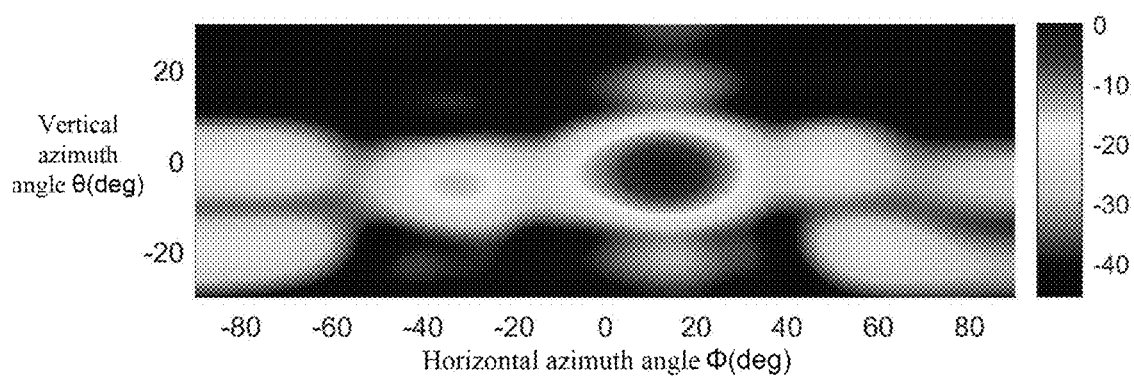
FIG. 4(b) is a simulated Butler beam forming power pattern at a time moment of t2 according to an embodiment of the present disclosure.
Figure 5A:
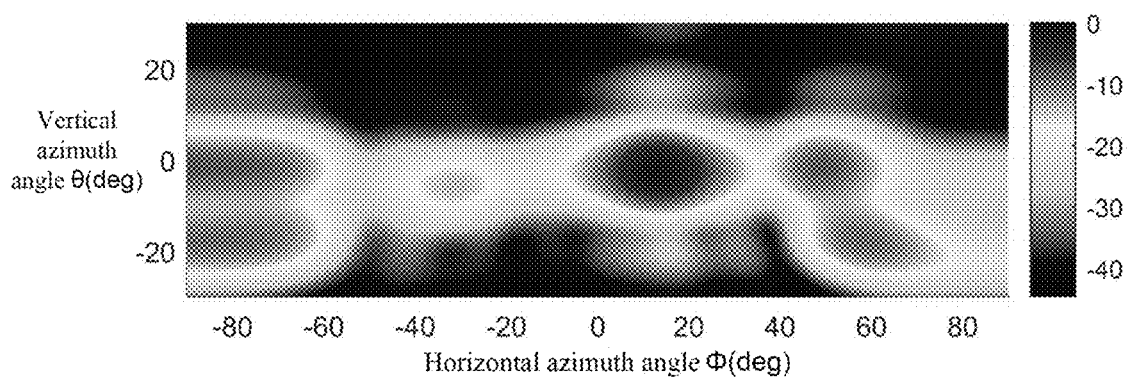
FIG. 5(a) is a target Butler beam forming power pattern at a time moment of t3 according to an embodiment of the present disclosure.
Figure 5B:
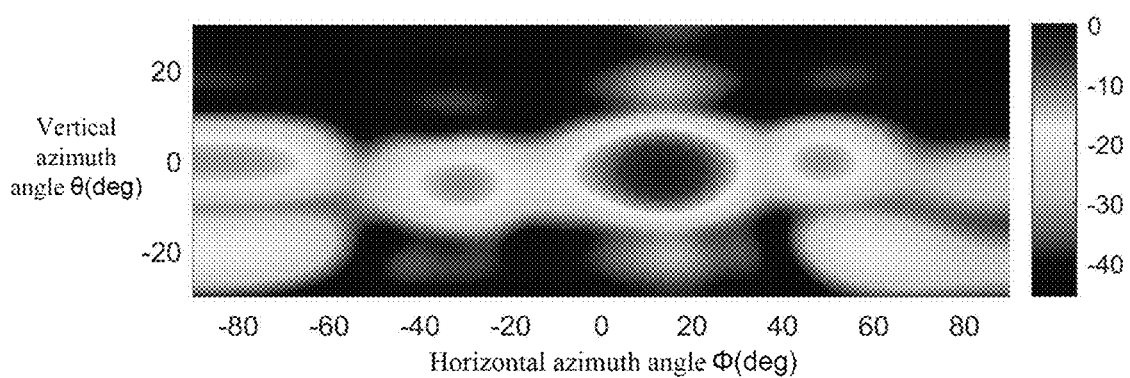
FIG. 5(b) is a simulated Butler beam forming power pattern at a time moment of t3 according to an embodiment of the present disclosure.
Figure 6A:
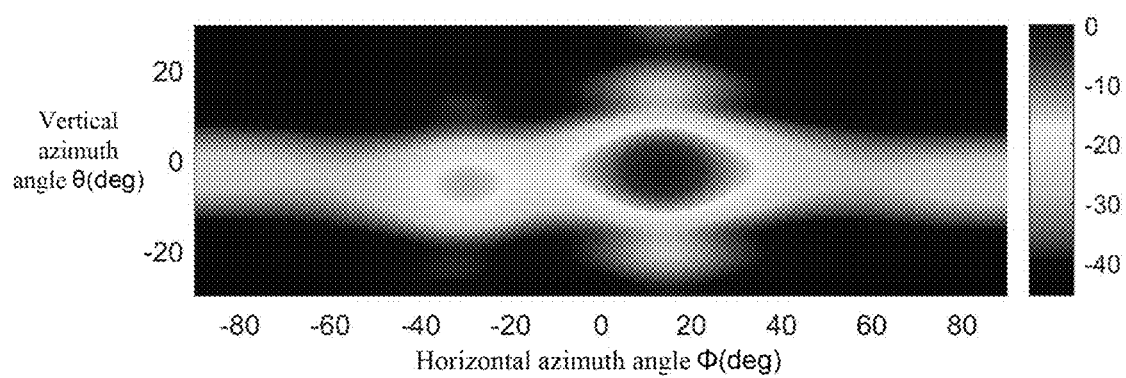
FIG. 6(a) is a target Butler beam forming power pattern at a time moment of t4 according to an embodiment of the present disclosure.
Figure 6B:
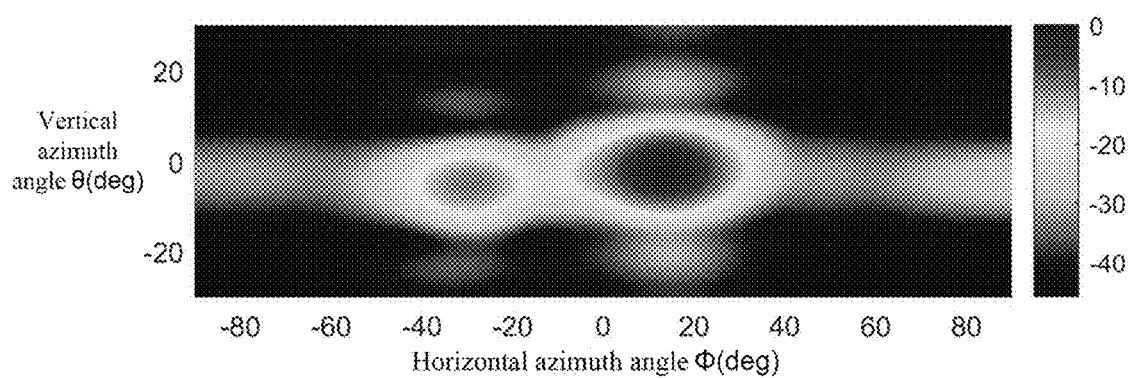
FIG. 6(b) is a simulated Butler beam forming power pattern at a time moment of t4 according to an embodiment of the present disclosure.
Figure 7A:
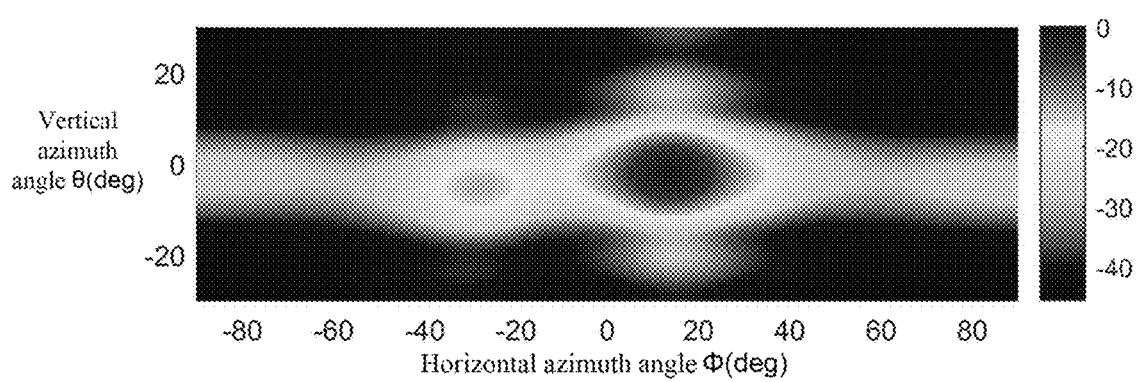
FIG. 7(a) is a target Butler beam forming power pattern at a time moment of t5 according to an embodiment of the present disclosure.
Figure 7B:
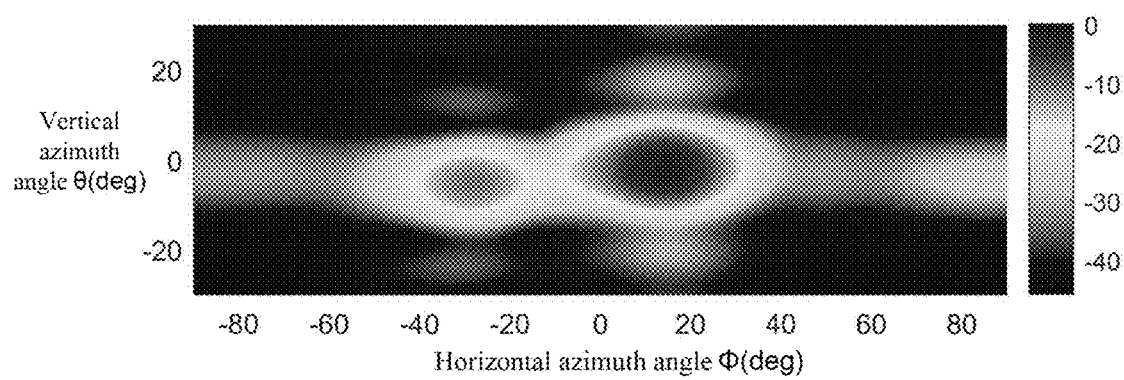
FIG. 7(b) is a simulated Butler beam forming power pattern at a time moment of t5 according to an embodiment of the present disclosure.
Figure 8A:
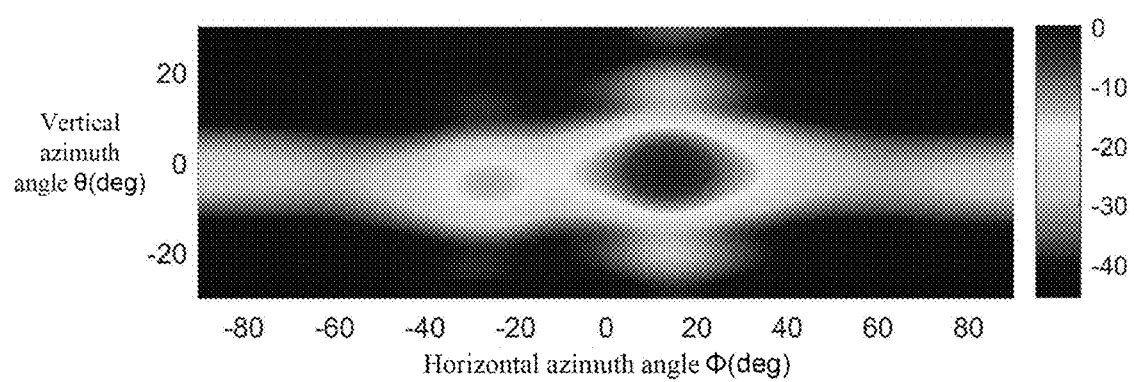
FIG. 8(a) is a target Butler beam forming power pattern at a time moment of t6 according to an embodiment of the present disclosure.
Figure 8B:
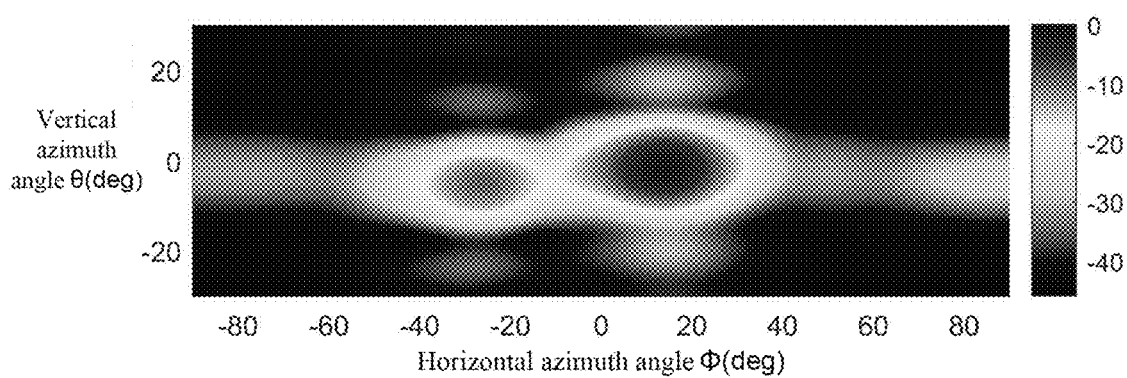
FIG. 8(b) is a simulated Butler beam forming power pattern at a time moment of t6 according to an embodiment of the present disclosure.

Firstly, channel modeling is carried out by the ray-tracing algorithm, and the specific scene for simulation is given. The time to be tested is discretized into 6 time moments [$t_1$, $t_2$, $t_3$, $t_4$, $t_5$, $t_6$], the corresponding positions are respectively [$p_1$, $p_2$, $p_3$, $p_4$, $p_5$, $p_6$], the ray-tracing results of the positions at 6 time moments in the constructed urban micro cell (Urban Micro, UMi) scene are shown as in FIG. 2(a), and constructing the ray-tracing result at the first moment in the scene is shown as in FIG. 2(b). The height of the base station is set to 15 meters, the carrier frequency is set to f=28 GHz, the height of user equipment at the receiving end is set to 1 meter, and the speed is 30 km/h. Reflective materials in the scene are all set to be ideal materials, the maximum number of reflections is 2, and the ray-tracing results at 6 time moments are shown as in Table 1. In addition, the ASA of each cluster is 22°, the ZSA of each cluster is 7°, and both the horizontal and vertical PAS conform to the Laplace distribution.

The ray-tracing result at each time moment in Table 1

|  | Cluster number | Power [dB] | Azimuth angle of arrival [°] | Zenith angle of arrival [°] | Horizontal line-of-sight angle [°] | Vertical line-of-sight angle [°] |
|---|---|---|---|---|---|---|
| $t_1$ | 1 | −2.1 | −101.6 | 94.8 | 20.9 | 100.2 |
|  | 2 | −5.6 | −15.3 | 93.1 |  |  |
|  | 3 | 0 | −2.5 | 96.9 |  |  |
|  | 4 | 0 | −2.5 | 96.0 |  |  |
| $t_2$ | 1 | −0.6 | 30.6 | 97.1 | 17.7 | 99.6 |
|  | 2 | −8 | −15.5 | 93.1 |  |  |
|  | 3 | 0 | −85.6 | 98.7 |  |  |
|  | 4 | 0 | −85.6 | 97.7 |  |  |
| $t_3$ | 1 | −1 | 29.5 | 96.7 | 16.2 | 99.0 |
|  | 2 | −8 | −15.3 | 93 |  |  |
|  | 3 | 0 | −82.7 | 81.3 |  |  |
|  | 4 | 0 | −82.7 | 97.6 |  |  |

-continued

|  | Cluster number | Power [dB] | Azimuth angle of arrival [°] | Zenith angle of arrival [°] | Horizontal line-of-sight angle [°] | Vertical line-of-sight angle [°] |
|---|---|---|---|---|---|---|
| $t_4$ | 1 | 0 | 27.7 | 96.5 | 14.2 | 98.6 |
|  | 2 | −6.8 | −15.4 | 92.9 |  |  |
| $t_5$ | 1 | 0 | 26.3 | 96.3 | 12.6 | 98.3 |
|  | 2 | −6.8 | −15.9 | 92.9 |  |  |
| $t_6$ | 1 | 0 | 23.9 | 96.1 | 10.3 | 97.9 |
|  | 2 | −6.8 | −15.8 | 92.8 |  |  |

The horizontal coverage angle of the 4D-MPAC probe wall is set to −90° to 90°, the vertical coverage angle is 60° to 120°, the horizontal and vertical intervals of each probe are both 5°, so there is a total of probes of=32, the probe selection number M=(180/5-1)(60/5-1) (60/5-1)=385 is set, and it is assumed that the DUT is an array antenna of 8×8, and each single antenna is an omnidirectional antenna and perpendicular to horizontal antennae at an interval of λ/2. Correcting the channel model, subtracting the horizontal line-of-sight angle from all azimuth angles of arrival, and subtracting the vertical line-of-sight angle from all zenith angles of arrival. Then the target Butler beam forming power pattern and the simulated Butler beam forming power pattern at each time moment are shown as in FIG. 3(a), FIG. 3(b), FIG. 4(a), FIG. 4(b), FIG. 5(a), FIG. 5(b), FIG. 6(a), FIG. 6(b), FIG. 7(a), FIG. 7(b), FIG. 8(a), and FIG. 8(b), and PSP and 4D-PSP at each time moment are shown as in Table 2. It can be seen that 4D-PSP after probe selection can reach 85.85%, which has a good channel construction effect.

PSP and 4D-PSP at each time moment in Table 2

|  | Time moment | | | | | | |
|---|---|---|---|---|---|---|---|
|  | t1 | $t_2$ | $t_3$ | $t_4$ | $t_5$ | $t_6$ | 4D-PSP |
| No probe selection | 95.99% | 92.78% | 93.37% | 94.01% | 93.41% | 92.21% | 93.56% |
| Probe selection number 32 | 80.19% | 82.52% | 80.33% | 90.16% | 91.21% | 90.70% | 85.85% |

It may be understood that, the present disclosure is described by using some embodiments, and a person skilled in the art learns that various changes and equivalent replacements may be made to these features and embodiments without departing from the spirit and scope of the present disclosure. In addition, in the teachings of the present disclosure, these features and embodiments may be modified to adapt specific situations and materials without departing from the spirit and scope of the present disclosure. Therefore, the present disclosure is not limited by the specific embodiments disclosed herein, and all embodiments falling within the scope of the claims of the present disclosure fall within the protection scope of the present disclosure.

What is claimed is:

1. A four-dimensional over the air performance test method for a dynamic scene channel, comprising the following steps:
   step 1: performing dynamic scene channel modeling;
   step 1.1: determining the motion speed and trajectory of a device under test in a specific scene and a time T to be tested, and determining the position, transmitting power and frequency of a base station and the position, motion speed and direction of user equipment;

step 1.2: discretizing the time period T to be tested into N time moments $[t_1, t_2, \ldots, t_n, \ldots, t_N]$, each time moment respectively corresponding to one of positions $[p_1, p_2, \ldots, p_n, \ldots, p_N]$ of the user equipment, and respectively performing channel modeling algorithm simulation on the user equipment at each time moment to obtain a spatial channel model at each time moment, comprising an azimuth angle of arrival (AOA), a zenith angle of arrival (ZOA), an azimuth angle of departure (AOD), a zenith angle of departure (ZOD), power and delay of each cluster; stipulating azimuth angle spread of arrival (ASA), zenith angle spread of arrival (ZSA), azimuth angle spread of departure (ASD), zenith angle spread of departure (ZSD), and power angular spectrum (PAS) of each cluster, so as to complete modeling of a dynamic scene cluster delay line channel; and step 1.3: correcting the obtained channel model according to the relative line-of-sight direction between the device under test and the base station at each time moment, simulating the relative position between a terminal and the base station through a three-dimensional turntable, and cooperating with the multipath component simulated by an over the air probe to achieve a dynamic effect; and step 2: constructing a dynamic scene channel model in a multi-probe anechoic chamber test system;

step 2.1: by the constructed power angular spectrum of a target channel and an antenna array of the device under test, determining a target Butler beam forming power pattern $B_t$ in a multi-probe anechoic chamber sector, at the time moment of $t_n$, $B_t(\Omega,t_n)=a^H(\Omega)R_t(t_n)a(\Omega)$, wherein $\Omega=(\Theta,\phi)$ is a solid angle, $\Theta$ is a vertical azimuth angle, $\phi$ is a horizontal azimuth angle, $a(\Omega) \in C^{U \times 1}$ represents an array steering vector of the device under test when a spatial angle is $\Omega$ in a far-field condition, the $u^{th}$ element thereof is $a_u(\Omega)=e^{jkr_u}$, and $k=2\pi/\lambda[\cos\Theta\cos\phi,\cos\Theta\sin\phi,\sin\Theta]$ is a wave vector when the angle is $\Omega=(\Theta, \phi)$, wherein $\lambda$ is a wavelength; $r_u=[x_u,y_u,z_u]$ is a position vector of the $u_{th}$ antenna, wherein $x_u, y_u, z_u$ are respectively corresponding rectangular coordinates of the $u_{th}$ antenna in x, y and z directions; $R_t(t_n)$ is a spatial correlation matrix of the target channel of the device under test of an antenna, $R_t(t_n) \not\ni a(\Omega)P_t(\Omega,t_n)a^H(\Omega)$, wherein $P_t(\Omega, t_n)$ is a corresponding normalized power angular spectrum power when the spatial angle at the time moment of $t_n$ is $\Omega$;

step 2.2: according to the power angular spectrum distribution of the cluster at each time moment obtained by channel modeling, through a probe selection algorithm, selecting K activated antenna probes from a total of M antenna probes, and the selected K probes being used for simulating the dynamic scene channel model within the time period T to be tested;

step 2.3: calculating a simulated Butler beam forming power pattern Be through the selected K activated probes, at the time moment of $t_n$, $B_e(\Omega, t_n)=a^H(\Omega)R_e(t_n)a(\Omega)$, wherein $R_e(t_n) \in C^{U \times U}$ is a spatial correlation matrix, for simulating the dynamic channel, of the device under test having U antennae in total at the time moment of $t_n$, $R_e(t_n)=\Sigma^K_{k=1}a_e(\Omega_k)P_e(\Omega_k,t_n)a_e^H(\Omega_k)$, wherein $\Omega_k$ is a solid angle corresponding to the kth probe, $a_e(\Omega_k) \in C^{U \times 1}$ represents an array steering vector of a DUT under the setting of a multi-probe anechoic chamber when the spatial angle is $\Omega_k$ in a far-field condition, and the $u_{th}$ element is $$a_e(\Omega_k) = pl(d_{k,u})e^{j\frac{2\pi}{\lambda}d_{k,u}},$$

wherein $d_{k,u}$ represents the distance from the kth OTA probe to the $u_{th}$ antenna, and $pl(d_{k,u})$ represents the path loss in this distance; $P_e(\Omega_k, t_n)$ represents the normalized power of the over the air antenna probe with the spatial angle of $\Omega_k$ at the time moment of $t_n$;

step 2.4: proposing a time-averaged four-dimensional power spectrum similarity percentage for the construction quality of the multi-probe anechoic chamber dynamic channel test system in the continuous time T, namely, adding a time dimension on the basis of a static three-dimensional PSP, and the calculation method being as follows:

$$4D\text{-}PSP = \frac{1}{T}\int_T PSP(t)dt;$$

$$PSP(t) = \frac{1}{2}\int \left| \frac{P_r(\beta, t)}{\int P_r(\beta', t)d\beta'} - \frac{P_o(\beta, t)}{\int P_o(\beta', t)d\beta'} \right| d\beta \times 100\%$$

wherein T is the total sampling duration; 4D-PSP is the four-dimensional power spectrum similarity percentage; $P_o(\beta, t)$ is the target power angular spectrum calculated by using the Butler beam forming algorithm when the angle is $\beta$ at the time of t; $P_r(\beta, t)$ is the power angular spectrum of the constructed channel calculated by using the Butler beam forming algorithm; the angle is $\beta$; the time is a t time; and the four-dimensional power spectrum similarity percentage ranges from 0 to 1; and step 2.5: judging the construction quality of the dynamic channel according to the calculation result of the four-dimensional power spectrum similarity percentage.

2. The four-dimensional over the air performance test method for the dynamic scene channel according to claim 1, wherein in step 1.2, the azimuth angle of arrival and the azimuth angle of departure of each cluster are in the range of −180° to 180°, and the zenith angle of arrival and the zenith angle of departure of each cluster are in the range of 0° to 180°.

3. The four-dimensional over the air performance test method for the dynamic scene channel according to claim 1, wherein in step 2.4, a scheme for calculating the four-dimensional power spectrum similarity percentage when discrete points are taken is:

$$4D\text{-}PSP_t = \frac{1}{N}\sum_{n=1}^{N} PSP(t_n);$$

wherein N is the number of sampling times at the total time moment of discretizing.

* * * * *